United States Patent [19]
Czerwiak

[11] 3,873,132
[45] Mar. 25, 1975

[54] PLASTIC CONTAINER CLOSURE FLANGE

[75] Inventor: Marian A. Czerwiak, New York, N.Y.

[73] Assignee: American Flange & Manufacturing Co., Inc., New York, N.Y.

[22] Filed: Feb. 19, 1974

[21] Appl. No.: 443,683

[52] U.S. Cl.................. 285/21, 285/201, 220/39 R
[51] Int. Cl. ..... F16l 13/02, F16l 35/00, F16l 47/02
[58] Field of Search............ 220/39 R; 285/21, 201, 285/204

[56] References Cited
UNITED STATES PATENTS

| | | | |
|---|---|---|---|
| 3,353,849 | 11/1967 | Laurizio | 285/21 |
| 3,424,481 | 1/1969 | Fulghum | 220/39 R X |

Primary Examiner—George T. Hall

[57] ABSTRACT

A closure flange molded of synthetic plastic resin has an internally threaded cylindrical neck surrounded at one end by a circumferentially enlarged base. An annular groove is formed on the flange base for retention of a thermoplastic bonding element having electromagnetic conducting particles embedded therein. The flange manufacture includes making the bonding element up from an elongated strand into a complete annulus and securely inserting the annular bonding element within the groove in the flange base.

7 Claims, 10 Drawing Figures

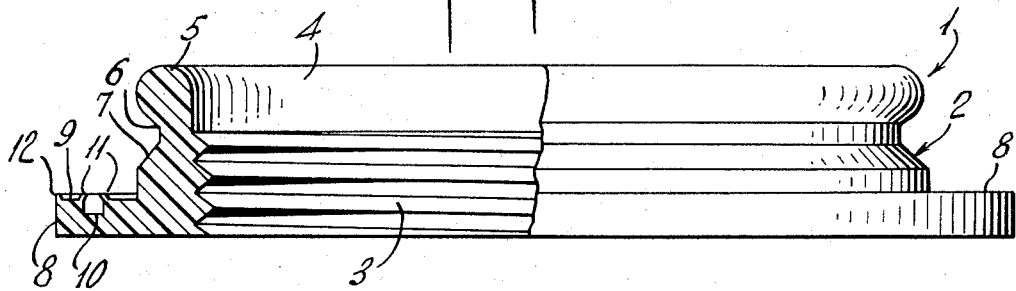
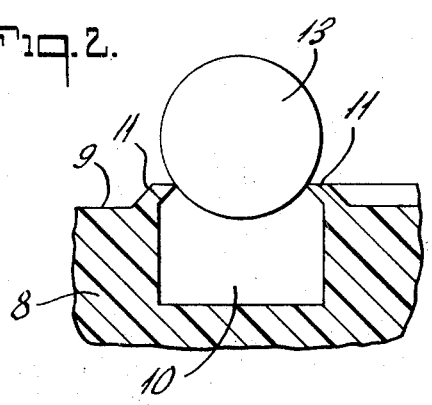
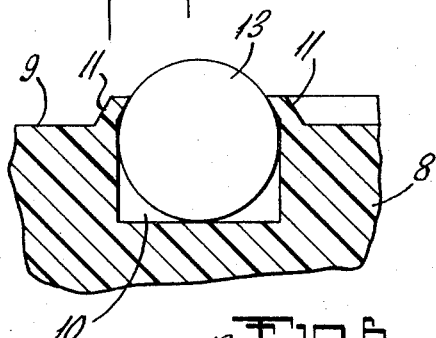
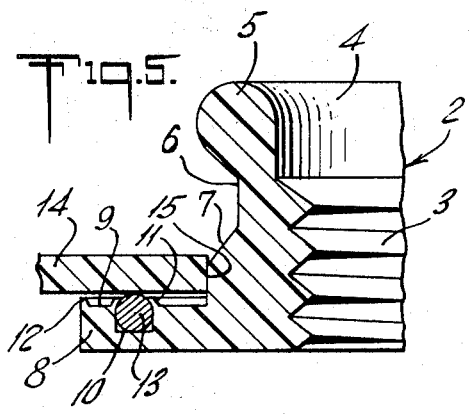
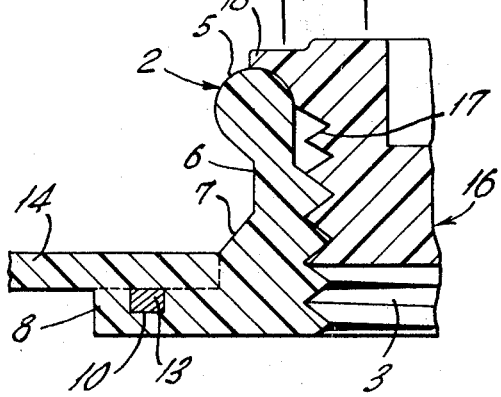
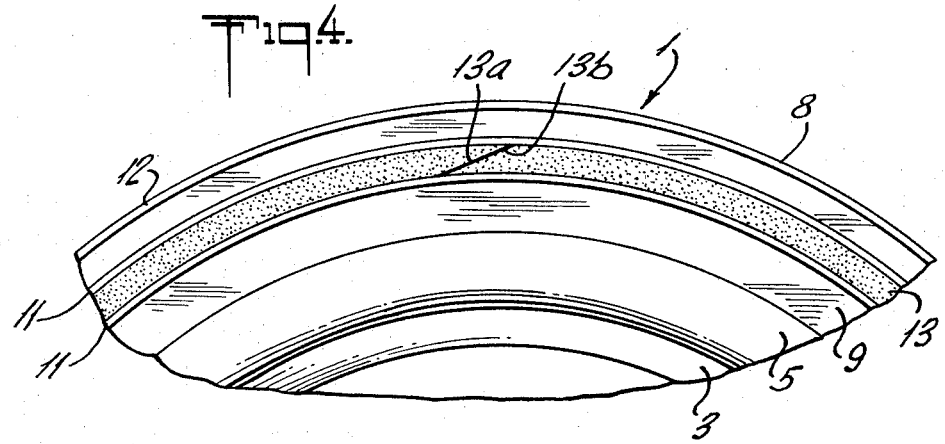

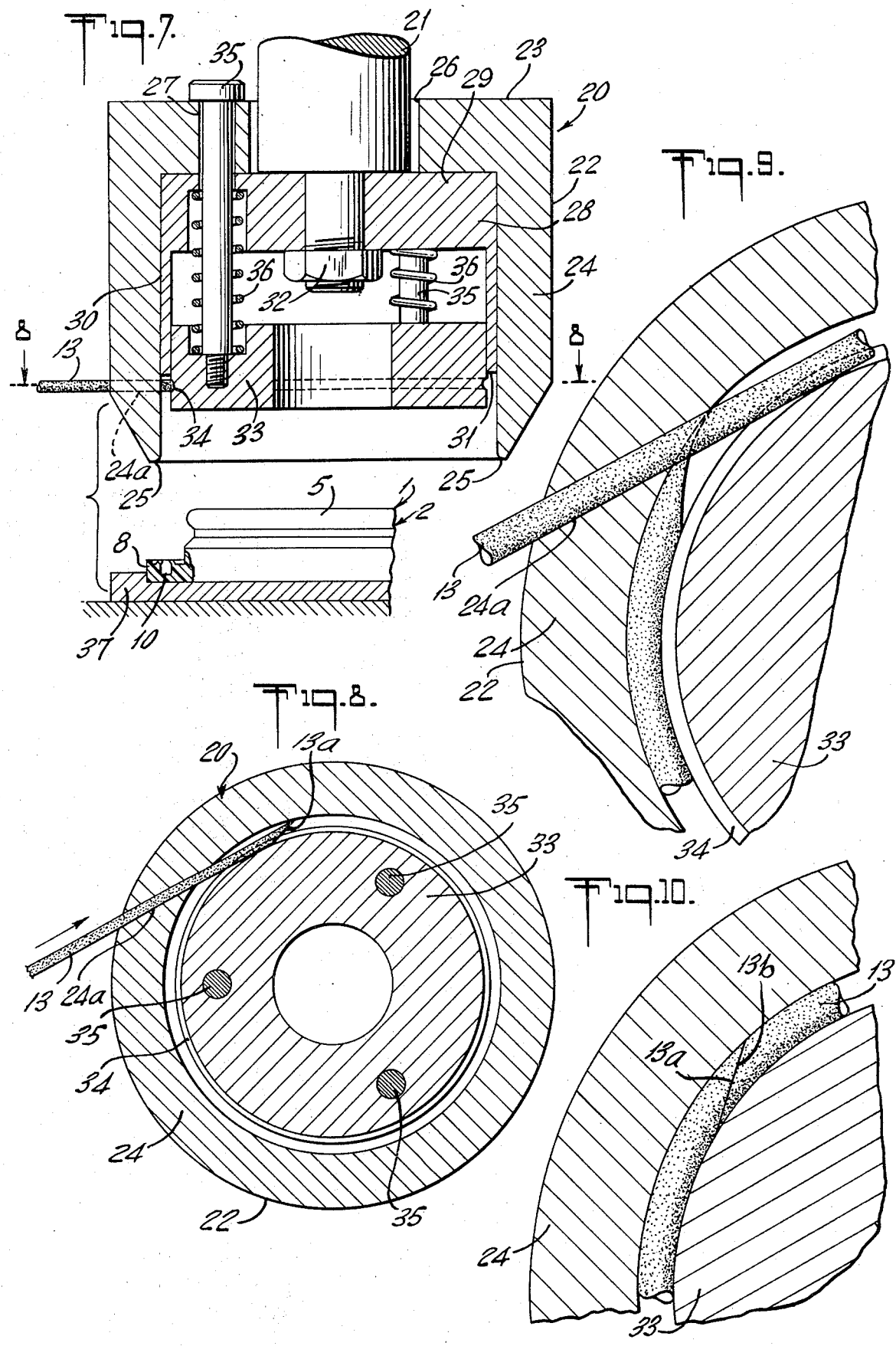

PLASTIC CONTAINER CLOSURE FLANGE

BACKGROUND OF THE INVENTION

In the manufacture of plastic pails and drums it has been proposed to provide a closure receiving neck thereon by permanently bonding an internally threaded closure flange about a flat opening molded within the container wall. One advantageously employed bonding technique consists of interposing an electromagnetic bonding element at the flange container wall interface. The bonding element is energized by placing the closure assembly within a high frequency magnetic field, causing a melt zone and resultant bonding at the flange container wall interface.

Heretofore a number of difficulties presented themselves in attempts to refine the above described bonding technique into an efficient container fabricating operation. One such difficulty concerns the need for a production oriented application of the bonding element to the groove in the flange base as opposed to a strictly manual operation. Another problem concerns the need for effectively forming a strand of electromagnetic bonding material into a complete and continuous annulus. Any space gap created at the intended juncture of the severed strand ends may introduce the likelihood of failure in bonding. Once the strand is properly applied to the flange base, the problem arises of securely retaining the bonding element within the flange base groove during subsequent shipping and handling conditions.

SUMMARY

The closure flange assembly and method of manufacture disclosed by the instant invention advantageously overcomes the above mentioned problems through the formation of a novel groove configuration in the flange base which precludes accidental dislodgment of the bonding element under the severest handling conditions. The method of manufacture herein disclosed includes feeding the bonding element as an elongated strand into a circular die cavity whereupon closing of the die severs the strand and inserts it as a complete annulus into the flange base groove.

It is, accordingly, a principal object of the invention to provide a new plastic closure assembly for thermoplastic bonding to a plastic container wall opening.

Another object is to provide a method of applying an electromagnetic bonding element to a closure flange to facilitate bonding to a container wall opening through the use of electromagnetic induction.

Still another object is to form an electromagnetic bonding element from an elongated strand into a complete annulus and apply the element to a closure flange so as to be securely retained thereon.

Other and more detailed objects will in part be obvious and in part be pointed out as the description of the invention taken in conjunction with the accompanying drawing proceeds.

BRIEF DESCRIPTION OF THE DRAWING

FIG. 1 is a part elevational, part sectional view of the closure flange of the invention;

FIG. 2 is an enlarged fragmentary sectional view showing the initial position of the bonding element as it is applied to the flange base;

FIG. 3 is a sectional view similar to FIG. 3 but showing the bonding element fully seated in the flange base;

FIG. 4 is an enlarged fragmentary top plan view of the flange base with the bonding element applied;

FIG. 5 is a fragmentary sectional view showing the flange in position for bonding within a container wall opening;

FIG. 6 is a sectional view similar to FIG. 4 but showing the completed bond and a closure plug in place;

FIG. 7 is an exploded sectional view of the mechanism for applying the bonding element to the flange base in accordance with the method steps of the invention;

FIG. 8 is a view taken on line 8—8 of FIG. 7 and looking in the direction of the arrows;

FIG. 9 is an enlarged fragmentary sectional view similar to FIG. 8 showing an advanced position of the strand of bonding material within the applying mechanism; and FIG. 10 is a sectional view similar to FIG. 9 showing a further advanced position with the strand severed and formed into a complete annulus.

As seen in FIGS. 1–6, the closure flange 1 is molded of a thermoplastic synthetic resin such as polyethylene and consists of an upstanding cylindrical neck 2 having an interior screw thread 3. The upper end of the flange neck has a short unthreaded portion 4 and terminates in a circumferentially enlarged bead 5. The exterior surface of the flange neck 2 has a short section 6 of reduced diameter beneath the bead 5 and is then circumferentially thickened into a lower pilot portion as indicated at 7. An annular collar 8 surrounds the base of the flange neck having an upper surface 9. An annular, upwardly opening, groove 10 is formed in the upper surface 9 spaced radially outwardly from the thickened pilot portion 7 of the flange neck. The mouth of the groove 10 is partially closed off by a pair of annular ribs 11, one at each side of the groove and extending above the flange upper surface 9. An additional annular rib 12, extending above the upper surface 9, is formed at the outer edge of the collar 8.

The final step in the flange manufacture involves the application of an electromagnetic bonding element 13 to the flange collar for the purpose of forming a thermoplastic bond to a container wall opening. The bonding element here employed is made up from an elongated strand of thermoplastic material, circular in cross-section and having minute metal electromagnetic conducting particles embedded therein. The strand is formed into an annulus having overlapping end surfaces 13a and 13b which form a lap joint and insure against the presence of any radial gap in the bonding zone. As clearly see in FIGS. 2 and 3, the cross-sectional diameter of the bonding element 13 is substantially equal to the width of the groove 10 and slightly greater than the closest distance between the ribs 11. A downwardly directed force applied to the bonding element 13 causes the flexible ribs 11 to open up, allowing the element to enter the groove 10. Subsequent relaxation of the ribs after the element is fully seated within the groove serves to positively retain the element securely in place. The mechanical grip applied by the ribs 11 prevents accidental dislodgment of the element 13 during packing, shipping and handling of the finished flange.

The bonding of the flange 1 to a plastic container wall section, such as a pail head as indicated at 14, is accomplished by inserting the neck of the flange up through the container wall opening 15 which just fits over the enlarged neck pilot portion 7. In FIG. 5 the undersurface of the container wall, prior to bonding, rests on top of the bonding element 13 and just above the ribs 11 and 12. Induction welding of the flange to the surrounding container wall section commences upon the application of a vertical force to the assembly and introduction within the magnetic field of a high frequency induction heating generator. As the thermoplastic resin of the element 13 starts to melt, together with the walls of the groove 10, the ribs 11 and 12 also melt, causing the upper surface 9 of the collar 8 and the undersurface of the wall 14 to come together. The rib 12 being further removed from the bonding element 13 tends to melt more slowly, thus forming a dam against the outward flow of bonding material. As seen in FIG. 6, the result is a permanent homogeneous bonding at the flange container wall interface. It should be noted that the groove and cooperating ribs could also be formed on the undersurface of the flange collar to enable bonding of the flange to the exterior surface of a container wall such as would be required on blow-molded containers.

The bonded flange may then be fitted with a closure plug 16 having a threaded side wall 17 terminating at its upper end in a circumferentially enlarged head 18 designed for gasketing engagement with the flange bead 5. Further protection against leakage and pilfering can be had by crimping a tamperproof capseal (not shown) about the flange bead 5.

Considering the method herein disclosed for applying the bonding element to the flange, attention is directed to FIG. 7 which shows an applying head 20 mounted on a vertically moveable shaft 21. The head 20 consists of an inverted cup-shaped housing 22 having a base wall 23 and a depending cylindrical wall 24 terminating in a lowermost locating surface 25. A passage 24a, as clearly seen in FIG. 8, extends angularly through the wall 24 so as to communicate with the housing interior. The base 23 is formed with a large central opening 26 surrounded by three smaller holes 27. A cutter 28 is nested within the housing 22 having a base wall 29 surrounded by a depending cylindrical wall 30 terminating at its lower end in a shearing edge 31. The shaft 21 is slideably received through the center opening 26 in the housing member base 23 and is secured to the cutter base 29 by nut 32. A cylindrical plunger 33 is slideably mounted within the cutter 28 and has an outwardly opening groove 34 formed in its exterior surface. Three screws 35 extend through the holes 27 in the housing base 23 and are secured to the plunger 33. A coiled compression spring 36 surrounds each of the screws 35 so as to resiliently urge cutter 30 and plunger 33 apart.

In operation a flange 1 is seated on an anvil 37 positioned beneath the applying head 20. An elongated strand of electromagnetic bonding material 13 is fed into the passage 24a in the housing sidewall 24 and, as seen in FIG. 8, is guided by the groove 34 around the plunger 33 into an annular form. The head 20 is then lowered down over the flange with the locating surface 25 resting against the upper surface 9 of the flange collar, and with the plunger 33 resting on top of the flange bead 5. Continued downward movement of the shaft 21 overcomes the compression of springs 36 and urges the cutter 28 downwardly relative to the housing and plunger. In so doing the shearing edge 31 is lowered over the passage 24a and severs the strand 13 along the interior surface of the housing wall.

As the cutter 28 continues to move downwardly, it pushes the element 13 ahead of it, forcing the element between the annular upstanding ribs 11 on the flange collar. The final downward movement of the cutter 28 firmly seats the element 13 within the flange groove 10 whereupon the head 20 is retracted upwardly and the parts thereof restored to their initial position. It should be noted that during the downward urging of the element 13 by the cutter 28, the leading cut end 13a and the trailing cut end 13b are lined up in a common axially extending plane as seen in FIG. 10. As a result the strand of electromagnetic bonding material is formed into a complete uninterrupted annulus with the angled surfaces 13a and 13b preventing a detrimental radially extending gap from occurring at the joint due to minor variations in the strand length.

From the foregoing it is seen how a container closure flange molded of synthetic resin can be very simply assembled with an electromagnetic bonding element for thermoplastic induction bonding to a container openings. The assembly operation disclosed, while lending itself very well to an automatic or semiautomatic production operation, also contributes to the quality and effectiveness of the bond between the flange and the container wall.

Having described my invention, what I claim is as follows:

1. A closure flange molded of synthetic plastic resin for electromagnetic bonding to a plastic container wall opening comprising an upstanding cylindrical neck, a screw thread formed on said neck, a laterally extending annular collar surrounding said neck, an axially opening circular groove formed on said collar adapted to receive an electromagnetic bonding element and means integrally molded in conjunction with said groove for positively retaining said element in seated position within said groove.

2. A closure flange as in claim 1 wherein said retaining means partially closes off the mouth of said groove.

3. A closure flange as in claim 2 wherein said retaining means consists of a pair of concentric upstanding annular ribs bordering said groove.

4. A closure flange as in claim 1 including an electromagnetic bonding element formed as a complete annulus and retained within said groove.

5. A closure flange as in claim 4 wherein said bonding element has a circular vertical cross-sectional configuration and extends above said ribs.

6. A closure flange as in claim 4 wherein a lap joint is formed in said annular bonding element.

7. A closure flange as in claim 1 wherein said screw thread is formed on said neck interior for reception of a closure plug.

* * * * *